(12) United States Patent
Lim

(10) Patent No.: US 10,540,988 B2
(45) Date of Patent: Jan. 21, 2020

(54) METHOD AND APPARATUS FOR SOUND EVENT DETECTION ROBUST TO FREQUENCY CHANGE

(71) Applicant: Electronics and Telecommunications Research Institute, Daejeon (KR)

(72) Inventor: Woo-taek Lim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 16/196,356

(22) Filed: Nov. 20, 2018

(65) Prior Publication Data

US 2019/0287550 A1    Sep. 19, 2019

(30) Foreign Application Priority Data

Mar. 15, 2018  (KR) .................. 10-2018-0030329

(51) Int. Cl.
*G10L 21/14* (2013.01)
*G10L 25/30* (2013.01)
*G10L 21/12* (2013.01)

(52) U.S. Cl.
CPC .............. *G10L 21/14* (2013.01); *G10L 21/12* (2013.01); *G10L 25/30* (2013.01)

(58) Field of Classification Search
None
See application file for complete search history.

(56) References Cited

U.S. PATENT DOCUMENTS

| 9,378,733 | B1* | 6/2016 | Vanhoucke ............ G10L 15/02 |
| 2016/0078863 | A1 | 3/2016 | Chung et al. |
| 2016/0260426 | A1 | 9/2016 | Kim et al. |
| 2018/0174575 | A1* | 6/2018 | Bengio .................. G10L 15/16 |
| 2019/0049989 | A1* | 2/2019 | Akotkar ............... G05D 1/0255 |

FOREIGN PATENT DOCUMENTS

| KR | 10-2017-0088165 A | 8/2017 |
| KR | 10-2017-0095582 A | 8/2017 |
| WO | WO 2014/196836 A1 | 12/2014 |

* cited by examiner

*Primary Examiner* — Paul W Huber
(74) *Attorney, Agent, or Firm* — NSIP Law

(57) ABSTRACT

Disclosed is a sound event detecting method including receiving an audio signal, transforming the audio signal into a two-dimensional (2D) signal, extracting a feature map by training a convolutional neural network (CNN) using the 2D signal, pooling the feature map based on a frequency, and determining whether a sound event occurs with respect to each of at least one time interval based on a result of the pooling.

11 Claims, 5 Drawing Sheets

METHOD AND APPARATUS FOR SOUND EVENT DETECTION ROBUST TO FREQUENCY CHANGE

CROSS-REFERENCE TO RELATED APPLICATION(S)

This application claims the priority benefit of Korean Patent Application No. 10-2018-0030329 filed on Mar. 15, 2018, in the Korean Intellectual Property Office, the disclosure of which is incorporated herein by reference for all purposes.

BACKGROUND

1. Field

One or more example embodiments relate to a method and apparatus for sound event detection robust to a frequency change.

2. Description of Related Art

Technology for detecting and recognizing a sound event is applicable in a real life to various fields such as environment context recognition, dangerous situation recognition, media content recognition, and situation analysis in wire communications and has been studied continuously.

Currently used sound event recognition technology principally includes research for verifying an excellent feature by extracting various feature values such as mel-frequency cepstral coefficient (MFCC), energy, spectral flux, and zero crossing rate from an audio signal, and research related to a Gaussian mixture model or rule-based classification method. Recently, a deep learning-based machine learning method has been studied to improve the above methods.

Deep learning is a type of artificial neural network, which is a scheme used to classify and recognize input data through a training result through iteration of linear fitting, non-linear transformation, and activation. Research on such an artificial neural network has not been developed for a long time due to a difficulty in optimization. However, various algorithms to solve issues in preprocessing, optimization, and overfitting have been recently studied, and the research has been conducted actively with the advent of a neural network, GPU operation, and big data.

Such a deep learning-based method is relatively excellent when compared to the existing methods. However, most of sound event detection studies have been conducted using audio data including relatively little noise and from which voice recognition is easy, rather than a real-life environment, and thus utilization in a real life is difficult.

In this regard, IEEE challenge on detection and classification of acoustic scenes and events (DCASE Challenge) aiming at recognizing sound events occurring in a real life to develop technology applicable to the real life covers a subject of "audio signal detection in real life".

A sound recorded in a real life includes a number of unnecessary events as well as ambient noise, and thus it is difficult to detect a valid sound event in the sound. In detail, to detect a valid sound event, whether a sound event occurs needs to be determined with respect to a continuous audio signal. In addition, a class of event occurring also needs to be recognized. Further, since two or more events can occur concurrently, a recognition rate of a sound event may decrease further in a case in which polyphonic recognition, not monophonic recognition, is to be solved.

A recognition rate for detecting a sound event in an audio signal recorded in a real life is not high since there is a possibility of determining that an event exists although a sound event does not occur in reality, or a possibility of determining that an event does not exist although an event occurs. This is referred to as a false alarm. As the false alarm decreases, the recognition rate of a sound event may increase.

SUMMARY

An aspect provides a sound event detecting method to be used in a real life.

Another aspect also provides a sound event occurrence detecting method robust to a frequency change.

According to an aspect, there is provided a sound event detecting including receiving an audio signal, transforming the audio signal into a two-dimensional (2D) signal, extracting a feature map by training a convolutional neural network (CNN) using the 2D signal, pooling the feature map based on a frequency, and determining whether a sound event occurs with respect to each of at least one time interval based on a result of the pooling.

The determining may include calculating a probability value of a sound event occurring with respect to each of the at least one time interval based on the result of the pooling, and determining whether a sound event occurs with respect to each of the at least one time interval based on the probability value.

The determining of whether a sound event occurs with respect to each of the at least one time interval based on the probability value may include determining that a sound event occurs at a time interval if a probability value corresponding to the time interval is greater than or equal to a predetermined value.

The sound event detecting method may further include classifying a sound event occurring at each time interval based on predefined sound event information.

The audio signal may be transformed into the 2D signal using one of fast Fourier transform (FFT), constant Q transform (CQT), and Wavelet.

According to another aspect, there is provided a sound event detecting apparatus including a memory configured to store a control program, a processor configured to operate based on the control program, and a receiver configured to receive an audio signal from an outside, wherein the control program may be configured to perform receiving an audio signal from an outside, transforming the audio signal into a 2D signal, extracting a feature map by training a CNN using the 2D signal, pooling the feature map based on a frequency, and determining whether a sound event occurs with respect to each of at least one time interval based on a result of the pooling.

The determining may include calculating a probability value of a sound event occurring with respect to each of the at least one time interval based on the result of the pooling, and determining whether a sound event occurs with respect to each of the at least one time interval based on the probability value.

The determining of whether a sound event occurs with respect to each of the at least one time interval based on the probability value may include determining that a sound event occurs at a time interval if a probability value corresponding to the time interval is greater than or equal to a predetermined value.

The control program may be further configured to perform classifying a sound event occurring at each time interval based on predefined sound event information.

The audio signal may be transformed into the 2D signal using one of FFT, CQT, and Wavelet.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Figure 1:
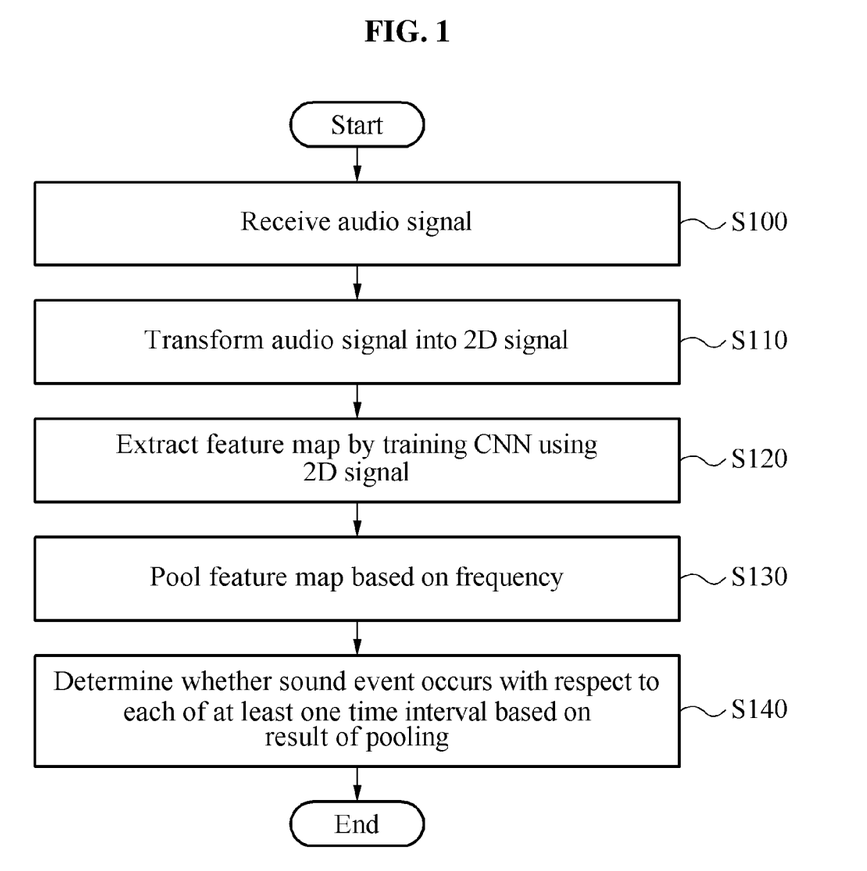
FIG. 1 is a flowchart illustrating a sound event detecting method according to an example embodiment.

FIG. 1 is a flowchart illustrating a sound event detecting method according to an example embodiment.

Referring to FIG. 1, in operation S100, a sound event detecting apparatus 100 may receive an audio signal from an outside.

The audio signal may be an electrical waveform signal transformed from a sound and include sound event information and/or noise.

In operation S110, the sound event detecting apparatus 100 may transform the audio signal into a two-dimensional (2D) signal.

The 2D signal may refer to data having two domains (or axes). The sound event detecting apparatus 100 may analyze the audio signal on a frame-by-frame basis and transform the audio signal into the 2D signal. The sound event detecting apparatus 100 may transform the audio signal into the 2D data using methods such as fast Fourier transform (FFT), constant Q transform (CQT), and Wavelet. In addition to the above methods, any method of representing data as a 2D signal may be applied to 2D transformation of the audio signal. The transformed 2D signal may be used as input data of a convolutional neural network (CNN).

The CNN is a deep learning method used principally in the field of image recognition, generation, and interpretation, and may extract a feature map by performing convolution using a fixed mask. One of characteristics of the CNN is to extract a meaningful feature such as an edge from an image using a kernel structure used for convolution. Such a feature may also apply to an example in which an audio signal is transformed into a 2D signal like an image and the 2D signal is used as an input of the CNN. That is, the CNN may detect an edge component from the 2D signal and learn from a low-level representation to a high-level representation. Further, a network may be configured and trained while compressing information through a pooling (or sub-sampling) process. A sound event may be detected using such a characteristic of the CNN. A pooling layer which performs pooling may reduce the spatial size of representation to reduce a computational complexity by reducing the number of parameters of the CNN. Pooling may be performed based on a maximum, a minimum, or an average.

In operation S120, the sound event detecting apparatus 100 may extract a feature map by training the CNN using the 2D signal.

The feature map may refer to input/output data of a convolutional layer included in the CNN. The second signal to be used for training may be configured in various sizes depending on a frame length, a frequency resolution, and a user input. The CNN may include various layers such as, for example, a convolutional layer, a pooling layer, an activation layer, a drop-out layer, and a softmax layer.

When the CNN is used for image recognition, a component such as an edge or a line may be extracted. Such component extraction may be used for audio signal analysis as well. In detail, the component such as the edge in the audio signal may be detected principally in a section in which a sound event occurs (that is, a time interval). By using the CNN with respect to the 2D signal transformed from the audio signal, the feature map in which a section including a relatively great number of major components of a sound is represented to be distinct from other sections may be extracted.

In operation S130, the sound event detecting apparatus 100 may pool the feature map based on a frequency.

The sound event detecting apparatus 100 may perform pooling only with respect to a frequency axis, which is one of the two axes, rather than pooling the extracted feature map as 2D data. As a result, information for each frame of a time axis, which is the other one of the two axes, may be compressed further as pooling is performed, whereby a one-dimensional (1D) vector the same as a frame length may be generated. The 1D vector including information regarding whether a sound event occurs for each frame generated through the above process may be used for sound event occurrence section detection or as a weight function (or a probability value) for sound event detection.

Figure 2:
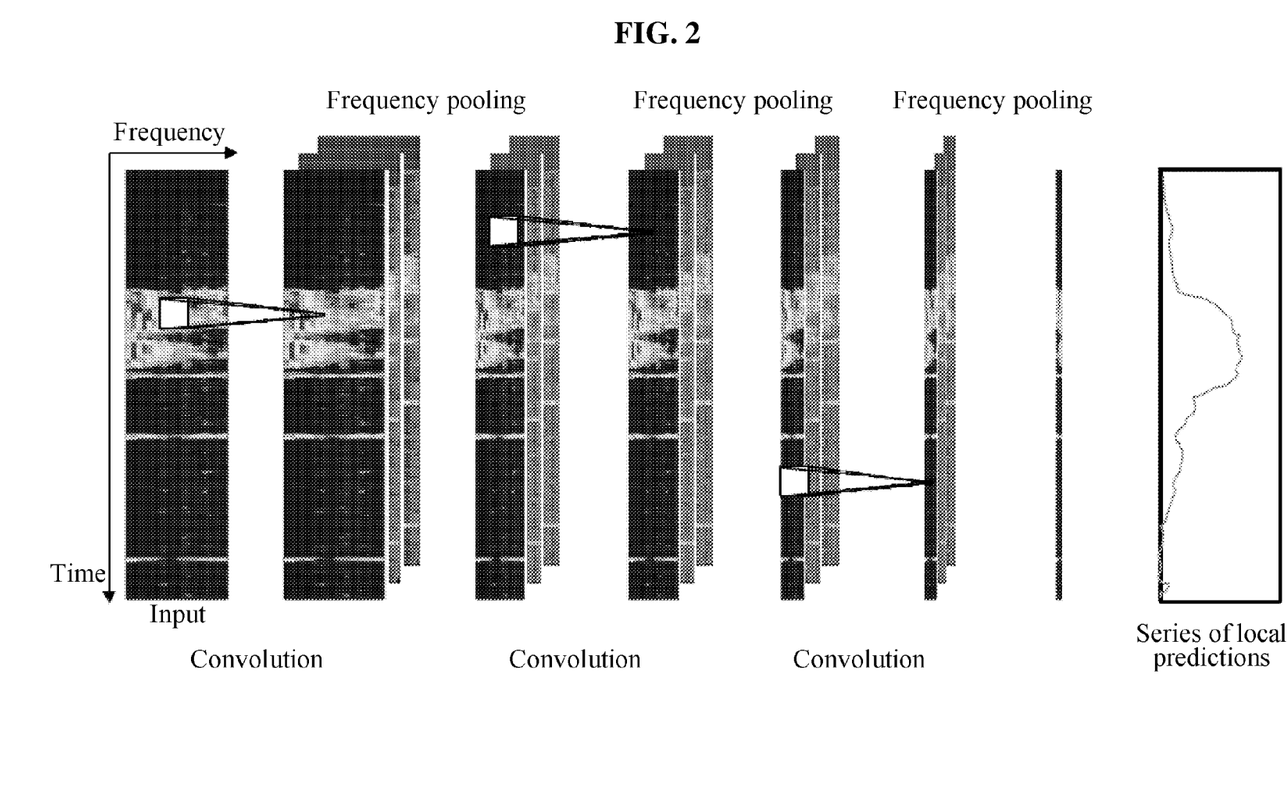
FIG. 2 illustrates a process of performing a sound event detecting method according to an example embodiment.

FIG. 2 illustrates a process of performing a sound event detecting method according to an example embodiment.

Referring to FIGS. 1 and 2, the sound event detecting apparatus 100 may generate a 1D vector by pooling a feature map based on a frequency a number of times. FIG. 2 illustrates a feature map one-dimensionally vectorized as being pooled based on the frequency a number of times.

For example, if the 1D vector is used for sound event occurrence section detection, whether a sound event occurs may be set to be "Yes (matching value: 1)" or "No (matching value: 0)" based on a predetermined threshold, and the set value may be assigned to each corresponding frame, whereby a section in which a sound event is present and whether a sound event occurs may be determined.

Further, if the 1D vector is used as a weight function for sound event detection, whether a sound event occurs may be output as a probability value and used to determine a sound event detection result in a future sound event detection process.

In operation S140, the sound event detecting apparatus 100 may determine whether a sound event occurs with respect to each of at least one time interval based on a result of the pooling.

The sound event detecting apparatus 100 may determine whether a sound event occurs based on a predefined (predetermined) sound event detection criterion and classify a sound event using a classifier. Such a process of determining whether a sound event occurs and classifying a sound event may be performed through one of various machine learning methods such as deep learning. The sound event detecting apparatus 100 may provide a user with a final result of determining whether a sound event occurs.

Figure 3:
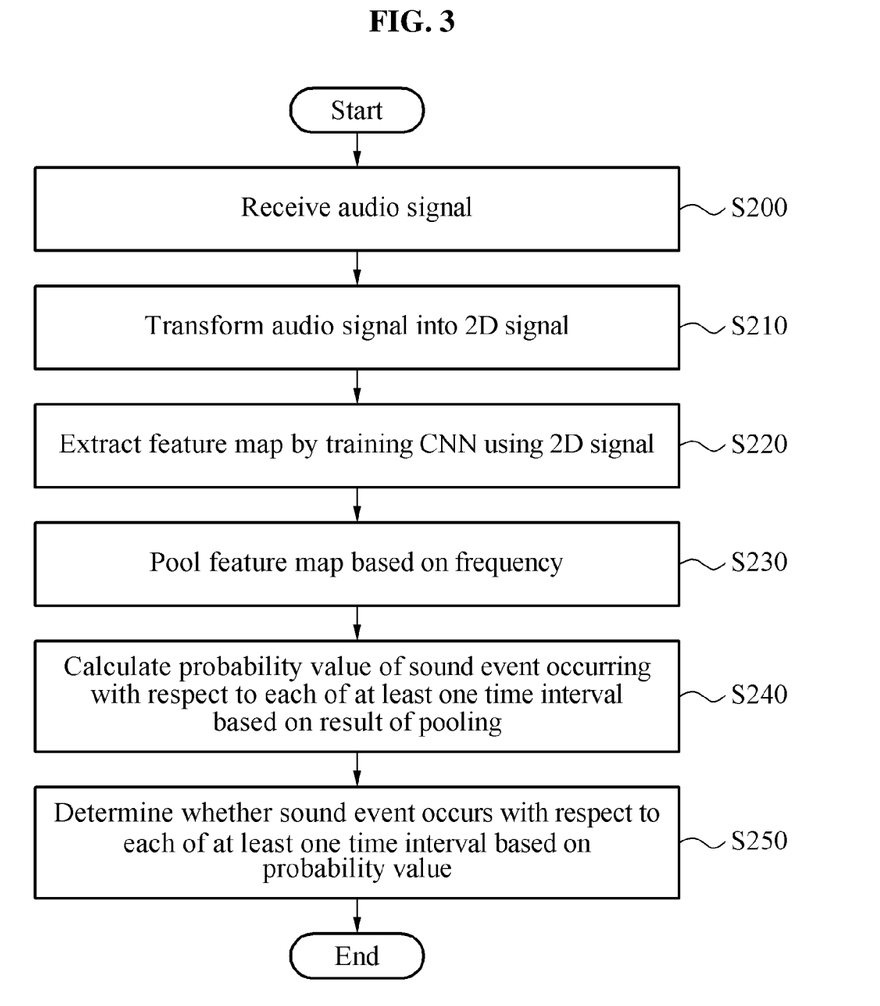
FIG. 3 is a flowchart illustrating a sound event detecting method according to an example embodiment.

FIG. 3 is a flowchart illustrating a sound event detecting method according to an example embodiment.

Referring to FIG. 3, in operation S200, the sound event detecting apparatus 100 may receive an audio signal from an outside.

In operation S210, the sound event detecting apparatus 100 may transform the audio signal into a 2D signal.

In operation S220, the sound event detecting apparatus 100 may extract a feature map by training a CNN using the 2D signal.

In operation S230, the sound event detecting apparatus 100 may pool the feature map based on a frequency.

In operation S240, the sound event detecting apparatus 100 may calculate a probability value of a sound event occurring with respect to each of at least one time interval based on a result of the pooling.

In operation S250, the sound event detecting apparatus 100 may determine whether a sound event occurs with respect to each of the at least one time interval based on the probability value.

Figure 4:
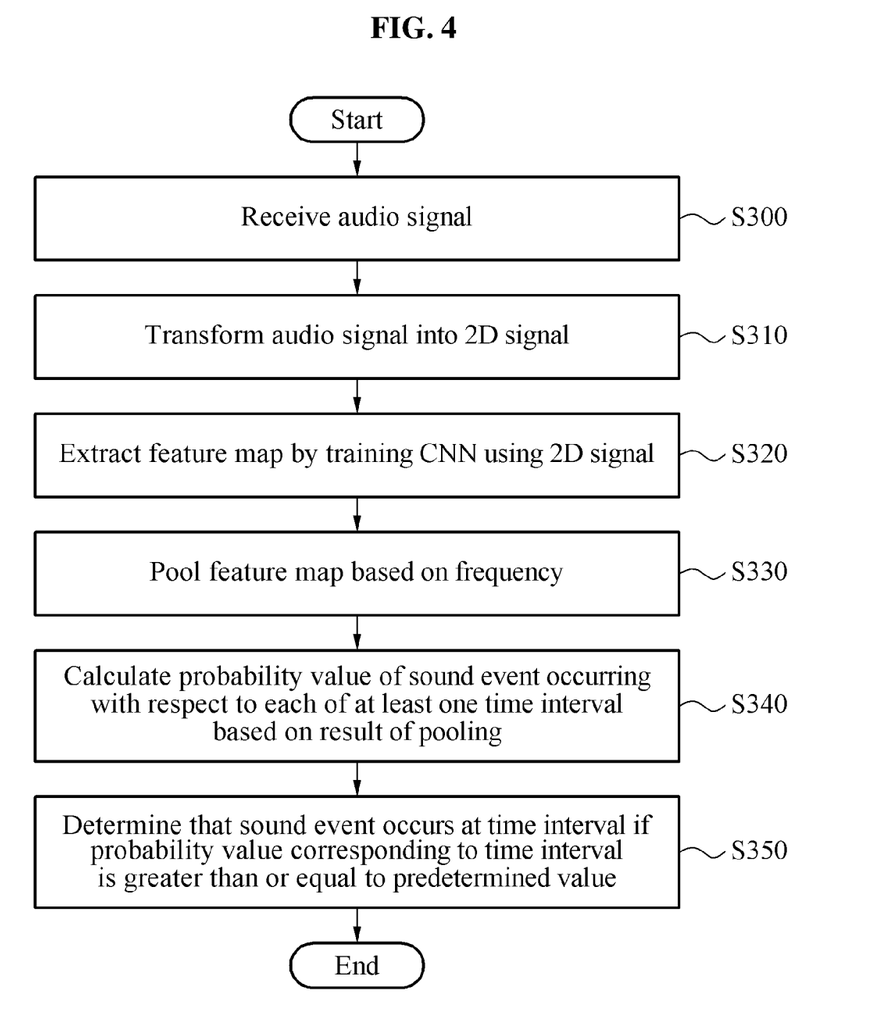
FIG. 4 is a flowchart illustrating a sound event detecting method according to an example embodiment.

FIG. 4 is a flowchart illustrating a sound event detecting method according to an example embodiment.

Referring to FIG. 4, in operation S300, the sound event detecting apparatus 100 may receive an audio signal from an outside.

In operation S310, the sound event detecting apparatus 100 may transform the audio signal into a 2D signal.

In operation S320, the sound event detecting apparatus 100 may extract a feature map by training a CNN using the 2D signal.

In operation S330, the sound event detecting apparatus 100 may pool the feature map based on a frequency.

In operation S340, the sound event detecting apparatus 100 may determine whether a sound event occurs with respect to each of at least one time interval based on a result of the pooling.

In operation S350, the sound event detecting apparatus 100 may determine that a sound event occurs at a time interval if a probability value corresponding to the time interval is greater than or equal to a predetermined value.

Figure 5:
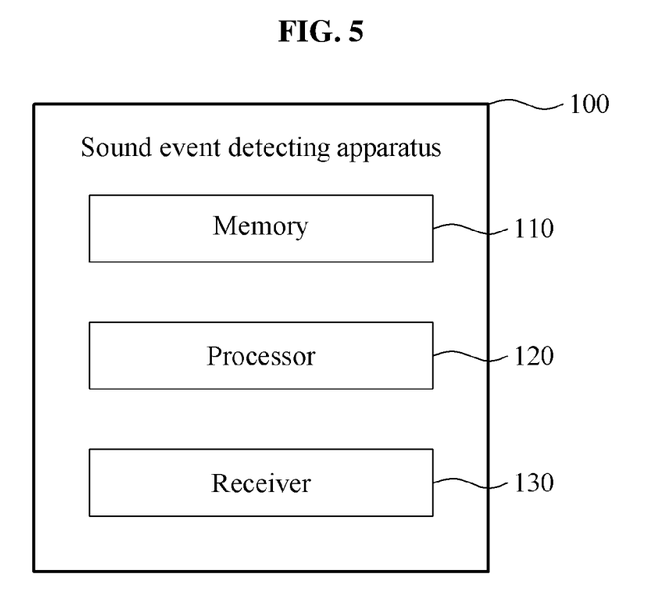
FIG. 5 is a block diagram illustrating a sound event detecting apparatus according to an example embodiment.

FIG. 5 is a block diagram illustrating a sound event detecting apparatus according to an example embodiment.

Referring to FIG. 5, the sound event detecting apparatus 100 may include a memory 110 configured to store a control program, a processor 120 configured to operate based on the control program, and a receiver 130 configured to receive an audio signal from an outside. The control program may perform an operation of receiving an audio signal from an outside, an operation of transforming the audio signal into a 2D signal, an operation of extracting a feature map by training a CNN using the 2D signal, an operation of pooling the feature map based on a frequency, and an operation of determining whether a sound event occurs with respect to each of at least one time interval based on a result of the pooling.

Among the operations included in the control program, the operation of determining whether a sound event occurs with respect to each of at least one time interval based on a result of the pooling may include an operation of calculating a probability value of a sound event occurring with respect to each of the at least one time interval based on the result of the pooling, and an operation of determining whether a sound event occurs with respect to each of the at least one time interval based on the probability value.

The control program may determine that a sound event occurs at a time interval if a probability value corresponding to the time interval is greater than or equal to a predetermined value after the operation of calculating a probability value of a sound event occurring with respect to each of the at least one time interval based on the result of the pooling is performed.

According to example embodiments, by training a CNN using an audio signal and pooling feature maps extracted during the training process with respect to a frequency domain, a sound event section detection method robust to a change in frequency axis may be provided. When such a method is used, event section detection robust to a Doppler effect of a situation in which a sound source in the neighborhood moves is possible, and thus an error detection rate may improve when compared to currently used methods.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A sound event detecting method performed by a sound event detecting apparatus, the sound event detecting method comprising:

receiving an audio signal;
transforming the audio signal into a two-dimensional (2D) time-frequency signal;
extracting a feature map from the 2D signal using a trained convolutional neural network (CNN);
pooling the feature map based on a frequency; and
determining whether a sound event occurs with respect to each of one or more time intervals based on a result of the pooling.

2. The sound event detecting method of claim 1, wherein the determining comprises:
calculating a probability value of a sound event occurring with respect to each of the one or more time intervals based on the result of the pooling; and
determining whether a sound event occurs with respect to each of the one or more time intervals based on the probability value.

3. The sound event detecting method of claim 2, wherein the determining of whether a sound event occurs with respect to each of the one or more time intervals based on the probability value comprises determining that a sound event occurs at a time interval if a probability value corresponding to the time interval is greater than or equal to a predetermined value.

4. The sound event detecting method of claim 1, further comprising:
classifying a sound event occurring at each time interval based on predefined sound event information.

5. The sound event detecting method of claim 1, wherein the audio signal is transformed into the 2D signal using one of fast Fourier transform (FFT), constant Q transform (CQT), and Wavelet.

6. A non-transitory computer-readable medium storing instructions that when executed by one or more processors, cause the one or more processors to perform the method of claim 1.

7. A sound event detecting apparatus, comprising:
a memory configured to store a control program;
one or more processors configured to operate based on the control program; and
a receiver configured to receive an audio signal from an outside,
wherein the control program is configured to perform:
receiving an audio signal from an outside,
transforming the audio signal into a two-dimensional (2D) time-frequency signal,
extracting a feature map from the 2D signal using a trained neural network (CNN),
pooling the feature map based on a frequency, and
determining whether a sound event occurs with respect to each of one or more time intervals based on a result of the pooling.

8. The sound event detecting apparatus of claim 7, wherein the determining comprises:
calculating a probability value of a sound event occurring with respect to each of the one or more time intervals based on the result of the pooling; and
determining whether a sound event occurs with respect to each of the one or more time intervals based on the probability value.

9. The sound event detecting apparatus of claim 8, wherein the determining of whether a sound event occurs with respect to each of the one or more time intervals based on the probability value comprises determining that a sound event occurs at a time interval if a probability value corresponding to the time interval is greater than or equal to a predetermined value.

10. The sound event detecting apparatus of claim 7, wherein the control program is further configured to perform classifying a sound event occurring at each time, interval based on predefined sound event information.

11. The sound event detecting apparatus of claim 7, wherein the audio signal is transformed into the 2D signal using one of fast Fourier transform (FFT), constant transform (CQT), and Wavelet.

* * * * *